US006173335B1

United States Patent
Culbert et al.

(10) Patent No.: US 6,173,335 B1
(45) Date of Patent: Jan. 9, 2001

(54) STRUCTURE AND PROTOCOL FOR ROUTING INFORMATION IN A SYSTEM

(75) Inventors: Daniel J. Culbert, Los Altos; Robert V. Welland, Menlo Park, both of CA (US)

(73) Assignee: Apple Computer, Inc., Cupertino, CA (US)

(*) Notice: Under 35 U.S.C. 154(b), the term of this patent shall be extended for 0 days.

(21) Appl. No.: 08/099,841

(22) Filed: Jul. 30, 1993

(51) Int. Cl.[7] ................................................ G06F 9/00
(52) U.S. Cl. ................................................ 709/310
(58) Field of Search ................................ 395/700

(56) References Cited

U.S. PATENT DOCUMENTS

| | | | | |
|---|---|---|---|---|
| 4,994,998 | * | 2/1991 | Anezaki | 364/900 |
| 5,257,369 | * | 10/1993 | Skeen et al. | 395/650 |
| 5,333,298 | * | 7/1994 | Bland et al. | 395/500 |
| 5,367,686 | * | 11/1994 | Fisher et al. | 395/700 |

OTHER PUBLICATIONS

Bilgic, Murat & Sarikaya, Behcet, Performance Comparison of ASN.1 Encoders/Decoders Using FTAM, Computer Communications Apr. 1993 V16 n4 p. 229 (12).*
O'Connor, Rory J., "Apple Banking on Newton's Brain", Apr. 22, 1992, San Jose Mercury News.
Weiman, Liza and Moran, Tom, "A Step Toward the Future", Aug. 1992, Macworld Magazine.
Soviero, Marcelle M., "Your World According to Newton", Sep. 1992, Popular Science Magazine.
Abatemarco, Fred, "From the Editor", Popular Science, Sep. 1992, p. 4.

* cited by examiner

Primary Examiner—Alvin E. Oberley
Assistant Examiner—St. John Courtenay, III
(74) Attorney, Agent, or Firm—Beyer Weaver & Thomas, LLP

(57) ABSTRACT

A structure and method for routing information desired by a particular entity within a pen-based computer system to that entity are provided. The desired information is contained in "packages" containing the desired information in one or more "parts" and also containing a package directory (located in front of the parts) that identifies the package and provides selected information about the package and its parts. The packages are received and processed by a package manager that maintains a registry of entities that desire specified types of information (parts) that might be found in an incoming package. When the package manager receives a package containing such information, it routes the part containing that information to a "part handler" associated with the entity requesting the information. The package manager then updates a package registry to reflect that the package has been successfully delivered.

31 Claims, 11 Drawing Sheets

STRUCTURE AND PROTOCOL FOR ROUTING INFORMATION IN A SYSTEM

BACKGROUND OF THE INVENTION

The present invention relates generally to computer systems, and more particularly to protocols and structures for routing information between software entities in a computer system.

Computerized personal organizers are becoming increasingly popular. They perform such functions as keeping calendars, address books, to-do lists, etc. While these functions can be provided by conventional computer systems, they are more conveniently provided by personal organizers which are relatively inexpensive, small, and lightweight (i.e. portable). Personal organizers are available from such companies as Sharp and Casio of Japan.

A relatively new form of computer, the pen-based computer system, holds forth the promise of a marriage of the power of a general purpose computer with the functionality and small size of a personal organizer. A pen-based computer system is typically a small, hand-held computer where the primary method for inputting data includes a "pen" or stylus. A pen-based computer system is commonly housed in a generally rectangular enclosure, and has a dual-function display assembly providing a viewing screen along one of the planar sides of the enclosure. The dual-function display assembly serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function displays of pen-based computer systems permit users to operate the computers as computerized notepads. For example, graphical images can be input into the pen-based computer by merely moving the stylus across the surface of the screen. As the CPU senses the position and movement of the stylus, it generates a corresponding image on the screen to create the illusion that the stylus is drawing the image directly upon the screen, i.e. that the stylus is "inking" an image on the screen. With suitable recognition software, the "ink" can be identified as text and numeric information.

Pen-based computer systems, like other computer systems, require some method of obtaining and routing information needed by the various software entities within the system. Examples of such information include text or graphic forms, dictionary entries, facsimile drivers, etc. These various pieces of information should be provided in a format that is consistent from one source to the next so that it can be processed consistently by the various applications or utilities within the computer system. The system for routing such information typically resides in the application or utility requiring the information.

In a typical operating system, applications requiring resources look to various system-wide managers. For example, an application would find fonts in a font manager and dictionaries in a dictionary manager. The user installs the fonts, dictionaries, and other resources in the appropriate manager in order for the resource to be usable by the application. Once, the fonts, dictionaries, and other resources have been installed, their association with the application is not maintained.

Although some existing computer systems have considerable convenience and flexibility, there remains a need for systems that provide universal methods of loading information from multiple media and automatically dispatch and remove that information when it is received.

SUMMARY OF THE INVENTION

The present invention provides a protocol for routing information desired by particular software entities within a system (such as a computer system). For example, the invention can route a dictionary entry or a font from a ROM to a manager where it is accessed by a text processing application desiring that dictionary entry or font. Alternatively, the invention can route a printer driver from a printer to an appropriate location in a computer system. This routing takes place automatically, without intervention by the user. Further, the routing system maintains the association between the information, its destination, and the structure in which it arrived.

The information transferred in the present invention is delivered in structures referred to here as "packages." Packages have certain attributes that facilitate easy and consistent identification and routing. The desired information in each package is contained in one or more "parts" of the package. In addition to the parts themselves, each package contains a package directory (located in front of the parts) that identifies the package and provides key information about the package and its parts.

Packages are received and routed by a processor referred to here as a "package manager." In addition to routing the packages, the package manager maintains a registry of software entities (more particularly "part handlers" associated with the entities) that have requested specified types of information (parts) that might be found in an incoming package. When the package manager receives a package containing such information, it routes the part containing that information to the part handler that requested the information. The package manager then updates its registry to reflect that the part has been successfully delivered. In addition to the registry of part handlers, the package manager also maintains a registry of packages that have been installed in the system. When a package is removed from the system, the registry of packages is updated to reflect this fact.

A particular advantage of this routing protocol is that it allows information from any of a number of different sources to be loaded by the same mechanism. Thus, for example, the same information can be dispatched with equal effectiveness from a block of memory on a PCMCIA-format flash card or from a stream of data over a network. Other sources of information that can be handled in the same manner include ROM cards, RAM, magnetic storage drives, serial ports, modems, pagers, etc. Another important advantage of the invention lies in its ability to maintain a centralized listing of the the various packages that have been installed and their location within the system. Further, the invention actually keeps track of the individual parts from a given package that have been handed off to various entities within the system. Thus, the system (and user) can easily determine the location of information currently installed and then quickly and completely remove selected entries. This is accomplished within the centralized routing system of this invention, independently of the individual entities receiving the parts.

In one aspect, the present invention provides the data structures or packages necessary for routing information.

Such packages include one or more parts, each having attributes including a "part kind" and a "part type." The part kind describes a known inherent feature of the part such as its language type or system-wide function. In a preferred embodiment, all parts in a package are identified as one of three part kinds: raw, frame, or protocol. Raw parts contain an unknown or uncharacterized type of information; frame parts contain a high level language; and protocol parts contain a "C" language class that allows objects to be dynamically loaded into the system to which the package has been sent. The second characteristic of a part, its part type, describes the type of software entity in the system that can recognize and use the part. For example, the part type might be a form, an application, a book identifier, a font, or dictionary entry.

In addition to the parts, packages of this invention include a package directory which provides information about the package itself and the individual parts it contains. Such information includes the package name, the package size, the directory size, etc. In preferred embodiments, the package directory is divided into three components: (1) a package header, (2) a part directory, and (3) an information area. The package header includes an identifier at the very beginning of the package indicating that the succeeding material is in fact a package. In addition, the package header includes one or more pointers (referred to here as information references) that point to the location of the package name, the package size, the directory size, and other information. The part directory includes "part entries" for the individual parts contained in the package. Each part entry contains an information reference specifying the location of a particular part and, in addition, that part's part kind and part type. Part entries may include other part information as well. Finally, the third region of the package directory, the information area, contains the specific information pointed to by information references in the package header. This includes the package name, the package size, the directory size, and other items pointed to by information references in the preceding portions of the package.

In another aspect, the present invention provides the routing system including package managers and part handlers. In this system, the package manager maintains a registry listing particular part types and associated part handlers desiring such parts. When a package arrives at the package manager, the manager first conducts a preliminary examination of the package to determine if it is a valid package. If so, the package manager then begins processing each part. The package manager determines the part's part type and searches its part type registry to determine whether that part type is currently registered. If so, the package manager simply dispatches the part to the part handler desiring such part, and then processes the next part. If, on the other hand, the part is of a type that has not been registered, the package manager must determine whether the part is otherwise usable. If not, all or some part of the package may have to be unloaded. This is because different parts from the same package typically act in conjunction to a desired end. If one part can not be installed, the other parts in the package may fail to perform as expected. The part handlers communicate with the package manager to facilitate routing of specific parts to the entities desiring them. Part handlers, in general, handle a particular data type for all applications in a system. Thus, neither the user nor the individual applications need to be concerned with loading the data. In addition to their role in routing, the part handlers install and remove parts as necessary.

A further understanding of the present invention will be had upon reading the following detailed description and studying the associated drawings.

DETAILED DESCRIPTION OF THE PREFERRED EMBODIMENTS

GENERAL

The present invention is well suited for pointer based computer systems such as the pen-based, pen-aware and mouse controlled systems that are currently popular. For the purposes of illustration, the invention will be described in connection with a pen-based system.

Figure 1:
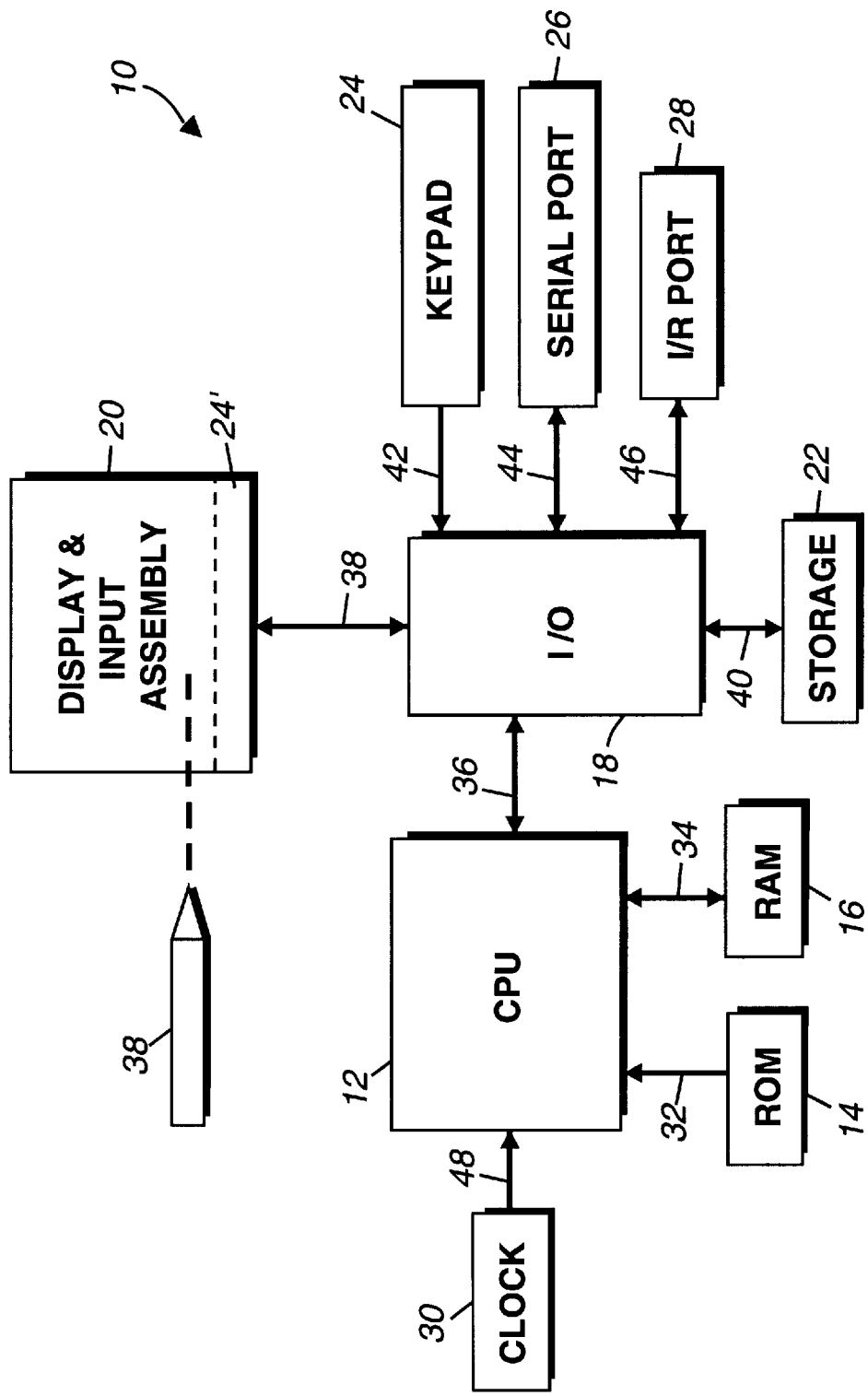
FIG. 1 is a block diagram of a computer system suitable for use in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22, a keypad (or keyboard) 24, a serial port 26, an infrared (I/R) port 28, and a clock 30.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 32. ROM 14 preferably contains the basic operating system for the pen-based computer system 10. CPU 12 is connected to RAM 16 by a bi-directional data bus 34 to permit the use of RAM 16 as scratch pad memory. ROM 14 and RAM 16 are also coupled to CPU 12 by appropriate control and address busses, as is well known to those skilled in the art. CPU 12 is coupled to the I/O circuitry 18 by bi-directional data bus 36 to permit data transfers with peripheral devices.

I/O circuitry 18 preferably includes a number of latches, registers and direct memory access (DMA) controllers. The purpose of I/O circuitry 18 is to provide an interface between CPU 12 and such peripheral devices as display assembly 20, mass storage 22, keypad 24, serial port 26, and I/R port 28.

Display assembly 20 of pen-based computer system 10 is both an input and an output device. Accordingly, it is coupled to I/O circuitry 18 by a bi-directional data bus 38. When operating as an output device, the display assembly 20 receives data from I/O circuitry 18 via bus 38 and displays that data on a suitable screen. The screen for display assembly 20 is preferably a liquid crystal display (LCD) of the type commercially available from a variety of vendors. The input device of display assembly 20 is preferably a thin, clear membrane which covers the LCD display and which is sensitive to the position of a stylus 38 on its surface. With such a structure, the membrane of the display assembly 20 can serve as an input "tablet." These position sensitive membranes are also readily available on the commercial market. Alternatively, other types of tablets can be used, such as inductively coupled tablets. Combination display assemblies such as display assembly 20 which include both the LCD and the input membrane are commercially available from such vendors as Scriptel Corporation of Columbus, Ohio.

Some type of mass storage 22 is generally considered desirable. Mass storage 22 can be coupled to I/O circuitry 18 by a bi-directional data bus 40. However, the mass storage 22 can be eliminated by providing a sufficient amount of RAM 16 to store user application programs and data. In that case, the RAM 16 can be provided with a backup battery to prevent the loss of data even when the pen-based computer system 10 is turned off. However, it is generally desirable to have some type of long term mass storage 22 such as a commercially available miniature hard disk drive, nonvolatile memory such as flash memory, battery backed RAM, a PCMCIA card, or the like.

Figure 2:
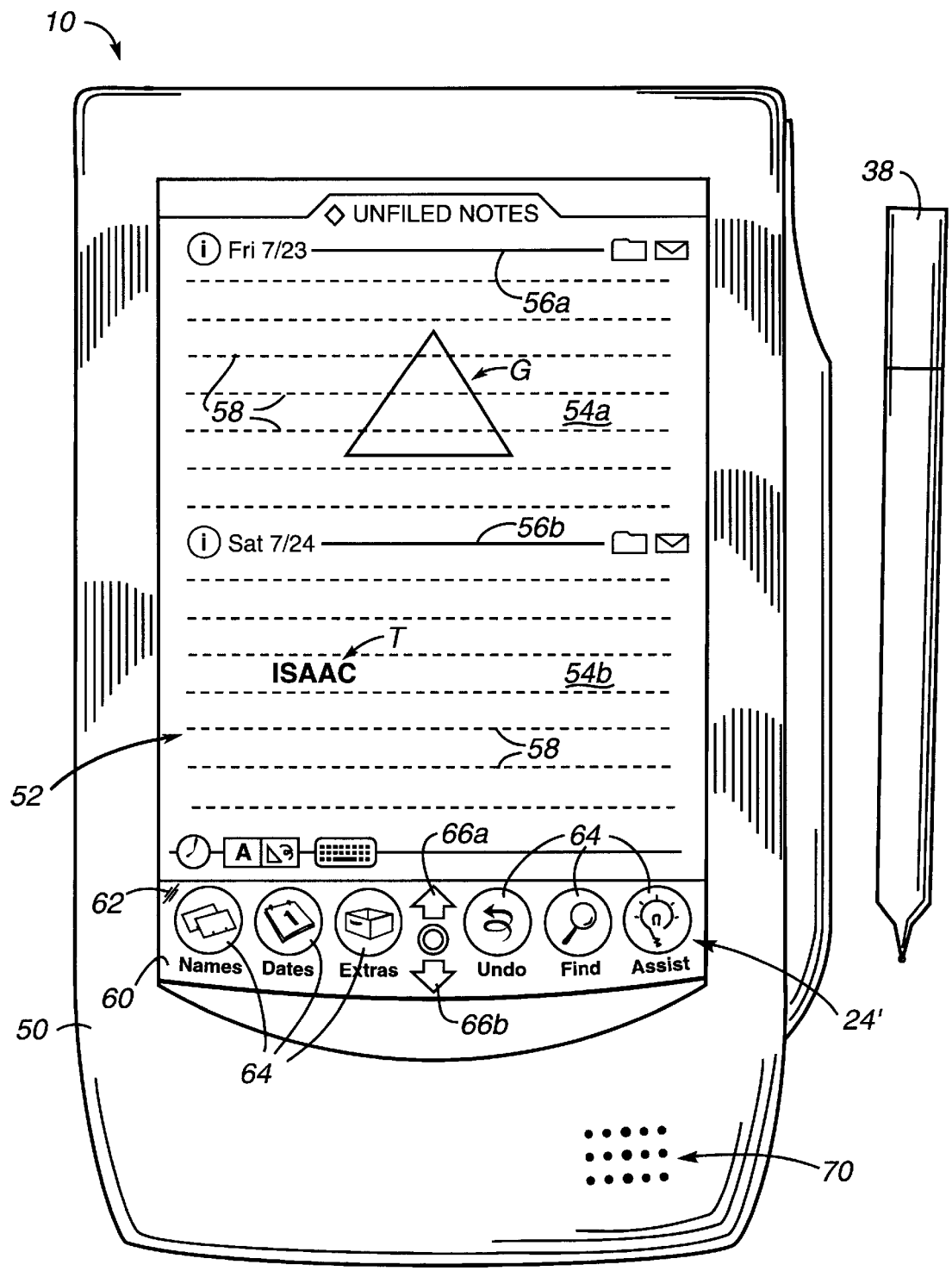
FIG. 2 is a top plan view of the screen, case, keypad, and stylus of the computer system of FIG. 1.

The keypad 24 can comprise an array of mechanical buttons or switches coupled to I/O circuitry 18 by a data bus 42. Alternatively, keypad 24 can comprise an entire, standard QWERTY keyboard. In the present embodiment, a separate keypad 24 is not used in favor of a "pseudo" keypad 24'. This "pseudo" keypad 24' comprises "button" areas which are associated with a bottom edge of the tablet membrane that extends beyond the lower edge of the LCD display. These button areas are defined by a printed or silk-screened icons which can be seen through the transparent membrane of the input tablet. When the "buttons" are selected by engaging the stylus 38 with the membrane over these printed icons, the membrane senses the pressure and communicates that fact to the CPU 12 via data bus 38 and I/O 18. An example of pseudo keypad 24' is shown in FIG. 2.

While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Serial port 26 is coupled to I/O circuitry by a bi-directional bus 44. The serial port 26 can be used to couple the CPU to external devices and networks.

Infrared (I/R) port 28 is coupled to I/O circuitry by a bi-directional bus 46. The I/R port can be used for outgoing information (e.g. to control a printer or some other external device, or to communicate with other computer systems) or for incoming information from other computers or devices.

Clock 30 preferably comprises a real-time clock to provide real-time information to the system 10. Alternatively, clock 30 can simply provide regular clock pulses to, for example, an interrupt port of the CPU 12 which can count the clock pulses to provide the time function. However, this alternative clock embodiment tends to be wasteful of CPU processing power. Clock 30 is coupled to CPU 12 by a data bus 48.

In operation, information is input into the pen-based computer system 10 by "writing" on the screen of display assembly 20 with the stylus 38. Information concerning the location of the stylus 38 on the screen of the display assembly 20 is input into the CPU 12 via data bus 38 and I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14, RAM 16, or mass storage 22. The CPU 12 next produces data which is transferred to the display assembly 20 via I/O circuitry 18 and data bus 38 to produce appropriate images on the screen portion of the display assembly 20.

In FIG. 2, the pen-based computer system 10 of FIG. 1 is shown housed within a generally rectangular enclosure 50. The CPU 12, ROM 14, RAM 16, I/O circuitry 18, and clock 26 are preferably fully enclosed within the enclosure 50. The display assembly 20 (FIG. 1) is mostly enclosed within the enclosure 50, but a viewing screen 52 of the display assembly is exposed to the user. As used herein, the term "screen" will refer to the portion of the display assembly 20 which can display an image that can be viewed by a user. Also accessible to the user is the pseudo keypad 24' that was described with reference to FIG. 1.

Upon power-up, pen based computer system 10 displays on screen 52 an initial "note" area 54a including a header bar 56a and a number of guidelines 58. The header bar 56a preferably includes the date of creation of the note area 54a and a number of icons and "soft" buttons, not particularly germane to the discussion of the present invention. For this reason, the header bar 56a will not be discussed in detail herein. The optional guidelines 58 aid a user in entering text, graphics, and data into the pen-based computer system 10. A graphic object G in the form of a triangle is shown entered within note area 54a.

Additional note areas, such as a note area 54b, can be formed by the user by drawing a substantially horizontal line across the screen 52 with the stylus 38. The substantially horizontal line is recognized by the system 10 and is converted into a second header bar 56b. Additional text, graphical, and other data can then be entered into this second note area 54b. For example, the text object T comprising "ISAAC" has been entered into second note area 54b.

In this preferred embodiment, the keypad 24', as explained previously, comprises a printed or silk-screened member 60 provided beneath a lower edge of a thin, clear, stylus-sensitive membrane 62 of the input "tablet." Alternatively, a keypad could comprise a mechanical keypad (or keyboard) 24, or a keypad could comprise "soft buttons" i.e. images generated at convenient locations on the screen 52, in which case a "button" would be activated by touching the stylus to the screen over the image of the button. The keypad 24' preferably includes a number of dedicated function buttons 64 and a pair of scroll buttons 66a and 66b. The operation of the note areas 54a, 54b, etc., scroll buttons 66a and 66b, and other aspects of computer system 10 are discussed in greater detail in co-pending U.S. patent application Ser. No. 07/868,013, filed Apr. 13, 1992 on behalf of Tchao et al., assigned to the assignee of the present invention and incorporated herein by reference in its entirety.

The screen illustrated in FIG. 2 is referred to as the "notepad", and is preferably an application program running under the operating system of the pen based computer system 10. In this preferred embodiment, the notepad is a special or "base" application which is always available beneath higher level applications. The notepad application, like other applications, run within a window, which in this instance comprises the entire viewing screen 52. Therefore, as used herein, a "window" is the entire screen or any portion of an entire screen which is dedicated to a particular application program.

A status bar 68 is provided at the bottom of the notepad application. The status bar 68 is provided with a number of active and display areas, which again are not particularly germane to the present invention and will therefore not be discussed in detail herein. U.S. patent application Ser. No. 07/976,970 filed Nov. 16, 1992 on behalf of Foster et. al, entitled "Status Bar for Application Windows" and assigned to the assignee of the present invention describes how to make and use the status bar, and is incorporated herein by reference in its entirety.

The enclosure 50 is preferably provided with apertures 70 which permit the free transmission of sound from a speaker (not shown) which is housed within enclosure 50. The speaker can be driven by the CPU 12, by I/O circuitry 18, or by specialized sound chips, as is well known to those skilled in the art. The speaker can be used to provide user feed-back, or to transmit audible information to a user.

Many of the software components employed in the system of this invention contain one or more "objects." As is well known to software developers, an "object" is a logical software unit comprising data and processes which give it capabilities and attributes. For example, an object can be queried as to its type and can return such data as the number of words that it contains, what its bounding box (BBOX) is, etc. Objects can contain other objects of the same or of a different type. Objects can also be used to project images on a screen according to their object type. Example of object types used in the following description include paragraph, line, and word objects. There are many well known texts which describe object oriented programming. See, for example, *Object Oriented Programming for the Macintosh*, by Kurt J. Schmucher, Hayden Book Company, 1986.

It will be noted that graphical elements may be used in the present invention. For example, the header bars 56*a* and 56*b* include lines and other graphical elements. Processes for drawing lines on a computer screen are well known to those skilled in the art. For example, graphics software such as QUICKDRAW from Apple Computer, Inc. of Cupertino, Calif. can be used to draw lines, simple geometrical shapes, etc. A description of the QUICKDRAW graphics software is found in the book *Inside Macintosh. Volumes I, II, and III*, by C. Rose et al., Addison-Wesley Publishing Company, Inc., July 1988. With such graphics software, a line can be drawn by simply specifying the coordinates of the beginning and the end of the line, and by specifying the width of the line.

Another preferred tool for implementing the system of the present invention is a view system. Various types of view systems are well known to those skilled in the art. In the present system, the notepad application on the screen 52 forms a first or "root" layer, with the status bar 68, for example, positioned in a second layer "over" the root layer. The various buttons of the status bar 68 are positioned in a third layer "over" the second and root layers. The view system automatically handles "taps" and other gestures of the stylus 38 on the screen 52 by returning information concerning the tap or gesture and any object to which it may be related. Again, the status bar 68 and the view system is described in greater detail in copending U.S. patent application Ser. No. 07/976,970, which has been incorporated herein by reference. It is therefore clear that the object oriented programming and view system software makes the implementation of the processes of the present invention less cumbersome than traditional programming techniques. However, the processes of the present invention can also be implemented in alternative fashions, as will be well appreciated by those skilled in the art.

OVERVIEW

As an example of how the present invention is implemented, consider a text processing application which requires a particular font. To obtain the font, a part handler associated with a font manager logs a request with a package manager The request specifies the part type desired (i.e. all parts of part type "font") and the specific part hander making the request. Next, the package manager searches an internal registry to determine whether that particular part type is currently registered. If the package manager's search reveals that the desired part type is not currently registered, the package manager then enters the part type and part handler in its registry and awaits parts of the type "font." These parts may contain many kinds of fonts (Courier, Helvetica, etc.). Sometimes the desired part type will already be registered by a different part handler associated with a different entity (maybe a graphics routine). If the package manager's search reveals that the desired part type is currently registered, the part handler making the registry request is so informed. The part handler must then either wait and try again later or make other arrangements, because the next time a package containing the desired part shows up, that part will be sent to the part handler currently registered.

The package manager acts a central clearing house for all packages sent by external sources over networks, modems, through lines connected to ROMs, etc. The desired font, for example, might be sent as a package from a ROM connected to a pen-based computer. While there may be numerous part handlers in a given computer system—each associated with a manager, an application, a utility, etc.—there will in general be only one central package manager. Upon receiving a valid package, the package manager notes each part's part type and determines whether a given part type is currently registered in its internal registry. If so, the part is dispatched to the part handler that requested the part. In the current example, if a package contains a part having the part type of the font desired by the text processing application, the package manager will dispatch that part to the part handler associated with the font manager. The part handler receiving that part will then load it as appropriate and await further fonts. When the part handler no longer needs fonts, it requests that the package manager deregister the part type from the package manager registry. In some cases, the part handler may require only a single font, in which case it will request deregistration before receiving further fonts.

In some embodiments, the part handler is also responsible for opening icons on the screen when certain parts have been accessed. Of course, there can be various errors associated with receiving and routing parts and packages. These errors and how the system of this invention responds to them will be discussed in more detail below.

Packages are typically autonomous units containing related parts that can be used by different entities in conjunction with one another. Thus, it is typically necessary to load and unload all or a large percentage the parts in a package. If the system is functioning properly, all or most of the part types in a package should be registered before the package manager receives the package. Thus, as the package manager iterates through the parts in the package, it will be able to dispatch each part, one at a time. If for some reason, the package manager can not dispatch a particular part, the entire loading process must typically fail unless the package contains instructions to the contrary. Thus, upon encountering a part that can not be loaded, the package manager sends removal instructions to each part handler having received a part from the package. The part handlers then remove the part.

Even when the entire package has been successfully installed, it may become necessary to remove the parts of that package at some time. For example, the user may wish to remove the package to free up some memory, or an external device may no longer require the services of some package contents. For example, when the package delivers a driver for a facsimile modem that is no longer being used, the system may instruct the package manager to have the driver removed.

One particularly beneficial aspect of the present invention is its versatility. The information contained in packages can be provided in any of a number of forms on various media. For example, packages may be loaded as a stream of data over e.g. a serial port, a modem, or an AppleTalk™ network. Packages obtained in this manner may originate with a "smart" peripheral such as a printer, for example. Alternatively, the information may be loaded directly from memory such as PCMCIA flash cards, ROM cards, RAM, etc. In addition, the content of the package information can be quite variable. Examples of information that can be delivered in packages includes, but is not limited to, fonts, applications, dictionaries, printer drivers, modem drivers, facsimile drivers, communication tools, custom recognizers, and book identifiers.

Another benefit of the system of this invention is that dispatching (including loading and removing) is essentially automatic and independent of the entities requiring parts. The application or other entity requiring information need not search for that information. Rather, the package manager (which is independent of the part handlers and entities they represent) oversees the dispatching operation and maintains a registry listing the location of each installed part. Thus, the entities requiring specific information are free to pursue other tasks while the package manager processes and directs the flow of packages.

THE PACKAGES

Figure 3:
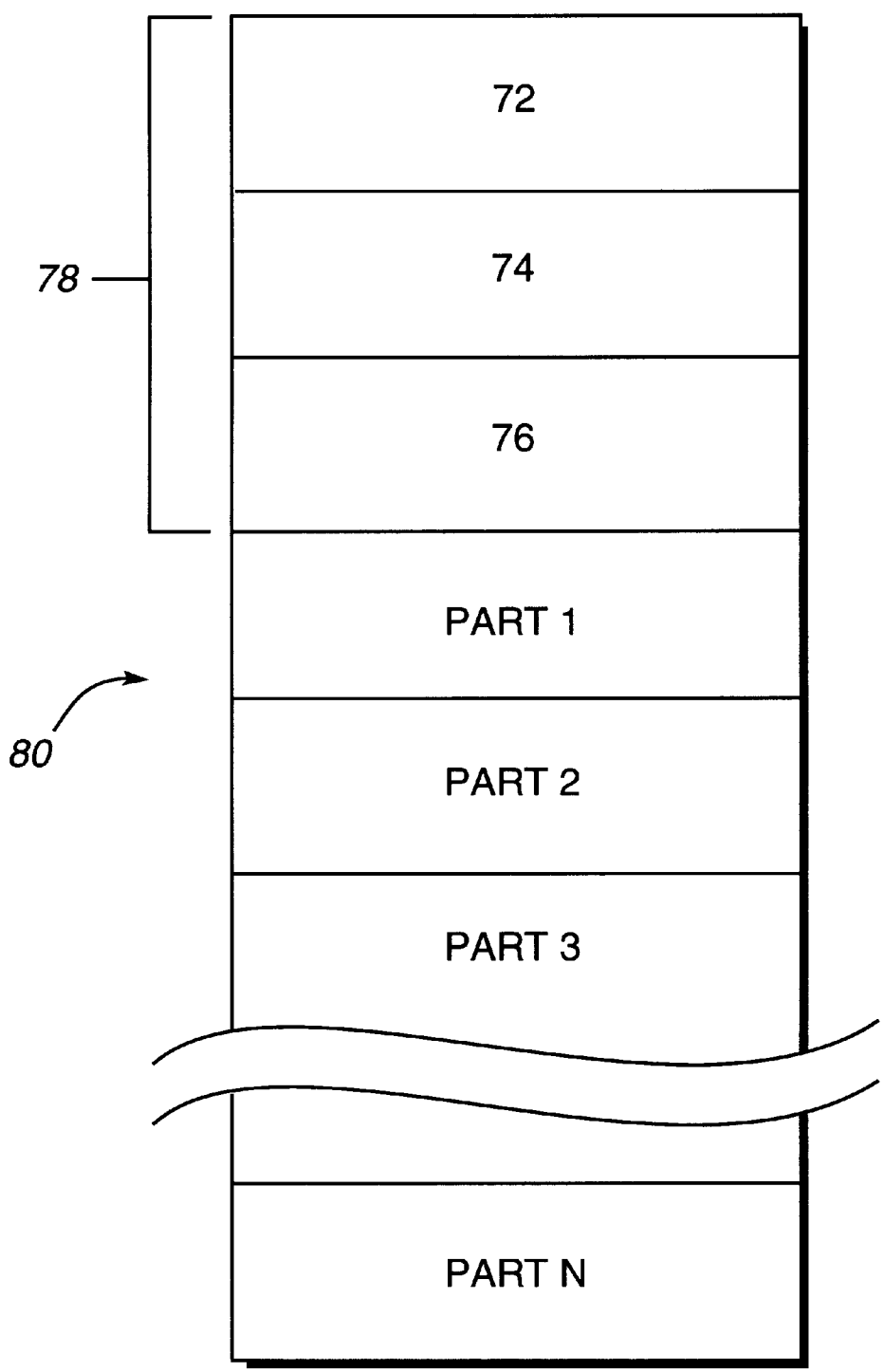
FIG. 3 is a block diagram of a complete package in accordance with the present invention.

Referring now to FIG. 3, a package 80 of the present invention is shown. As can be seen, the package 80 includes two primary components: a package directory 78 and one or more parts, denoted "Part 1," "Part 2," "Part 3," . . . "Part N." The package directory 78 includes, in turn, three components: a package header 72, a part directory 74, and an information area 76. This structure (as depicted in FIG. 3) can be viewed as block of data or information containing various specified fields of fixed and variable length, as well as a number of pieces of information of arbitrary length and content (i.e., the parts). The top of the structure contains the first information to be read. From there, the information is read top down until the bottom of the structure is reached. Thus, the package directory of a package is always read before the parts. Likewise, within the package directory 78, the package header 72 is read first, the part directory 74 is read next, and the information area 76 is read last. Each of these three components has subcomponents which are read in a similarly sequential manner.

The parts of the package contain the information of use to software entities within the computer system. The package directory 78, however, contains the information needed by the package manager to correctly process and route the parts of the package to the various part handlers requesting them. More specifically, the package directory 78 contains information concerning certain attributes of the packages and parts such as size, type, etc. For example, the directory will specify each part's particular part kind and a particular part type.

Figure 4:
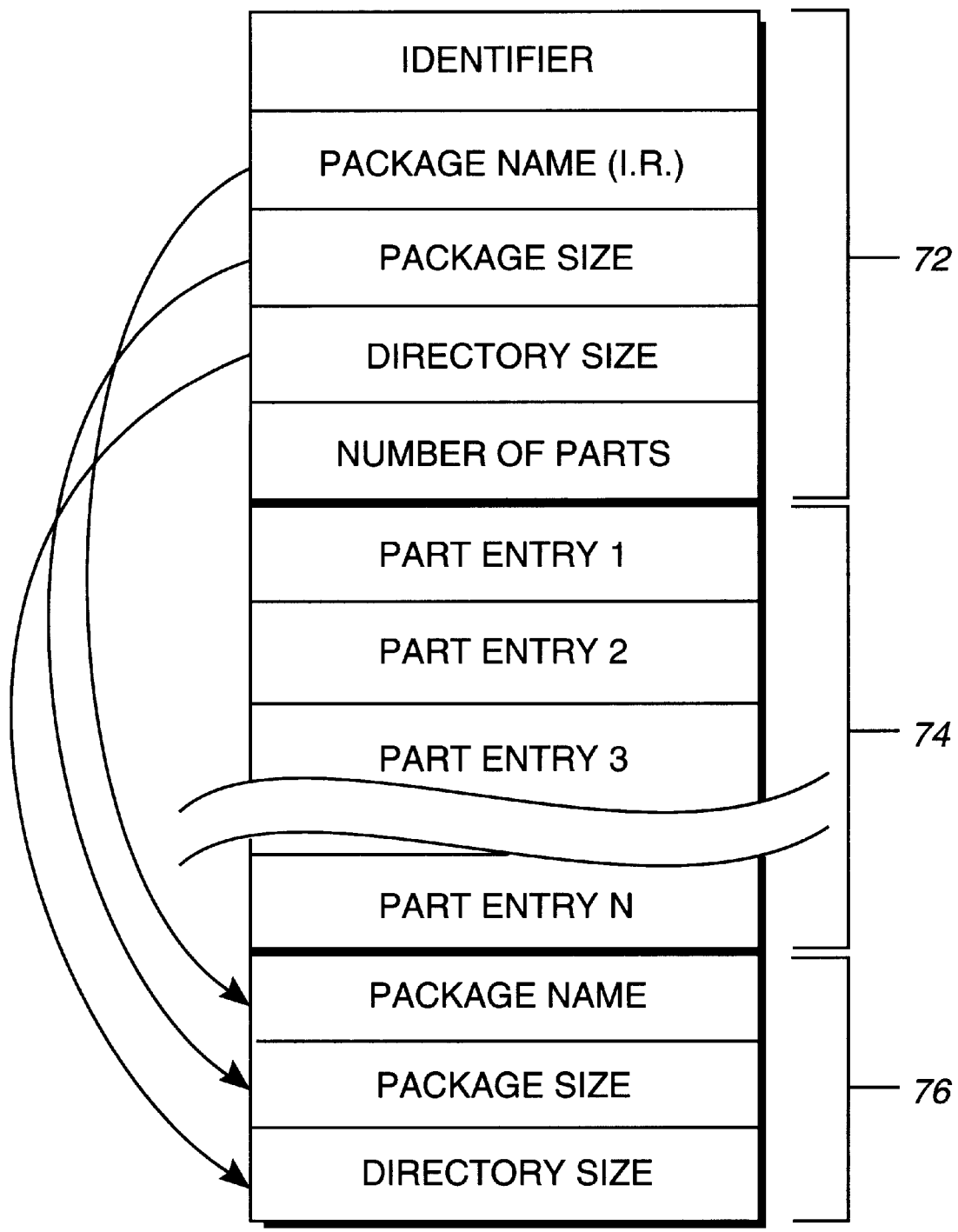
FIG. 4 is a block diagram of a package directory from the package in FIG. 3.

As shown in FIG. 4, the package header 72 includes an identifier 72 which is read first. The identifier is a unique block of information that tells the system that the succeeding information is a package. The identifier may be any unique label sufficient to specify that a package, as distinguished from some other block of information, is being received. Preferably, the identifier is at least 8 bytes long, so that it contains sufficient information to distinguish it from other arbitrary blocks of data. Once the system recognizes that a package is being received, the package manager begins reading the information contained in the package directory that follows the identifier. The remaining information in the package header is of two types: fixed field information and information references (designated by "(I.R.)" in FIG. 4). Information references are pointers which direct the package manager to look elsewhere for a particular type of information. Specifically, information references tell the package manager where to look by providing an offset from the package beginning or from some other fixed point in the package directory. At the point following the offset, the beginning of the desired information is located. In addition, information references contain the length of the piece of information. Thus, information references specify the location and length of various fields. They are particularly useful for information that may have widely varying lengths such as package names.

As shown in FIG. 4, an information reference pointing to the package name follows the identifier in package header 72. In addition, other information references pointing to a copyright notice and group information appear in the package header. As shown by the arrows on the left side of the package, each of these three information references point to specific sections of the information area 76 where the specified information (package name, copyright notice, and group information) is located.

Group information refers to fields that are purposely left blank so that space is available to define information that may be employed in alternative embodiments or future refinements of the system. As one example, the group information might contain data specifying which parts could be removed without affecting the usefulness of the package. This would be useful in those situations where the package contains some parts that are not critical to the functioning of certain other parts. If one or more of the non-critical parts are not recognizable by the system, those parts could removed while retaining the other, recognized parts. The group information field would specify which parts—if unrecognized—could be removed without requiring that the whole package be removed.

In addition to the fields pointed to by information references, the package header may contain various fixed fields. For example, the number of parts shown in FIG. 4 is a fixed field item. In addition, the package size and directory size are provided as fixed field data (not shown) in the package header. The package size describes the entire length of the package from the beginning of the identifier to the end of the last part. The directory size refers to the size of the entire package directory including the package header 72, the part directory 74, and the information area 76. Because this information will be contained within a field of preset length, it is provided within the package header 72 rather than in the information area 76. Other fixed field information that may be included within the package header includes flags, version number, creation date, and modification date.

The part entries of part directory 74 contain information references pointing to their associated parts. They also specify the part kind and part type for each part. This information is provided in fixed fields within the part entry. As noted above, the part kind describes a known inherent feature of the part such as its language type or system-wide function. In a preferred embodiment, all parts in a package are identified as one of three part kinds: raw, frame, or protocol. Raw parts contain an unknown or uncharacterized type of information; frame parts contain frames, the data and code structure of a high level language; and protocol parts contain a "C" language class that allows objects to be dynamically loaded to the system to which the package has been sent. Raw parts can in fact be frame or protocol parts which have not been identified as such. The part type describes the type of entity in the system that can recognize and use the part. For example, the part type might be a form, an application, a book identifier, or dictionary entry.

In addition to part size and part type, the part entries may contain part flags which provide specific details about how to treat the part. For example, a part flag might require that the part be automatically loaded or removed under certain circumstances, independently of instructions from a part handler. A part flag may also specify that a part is automatically copied into a separate area during loading. For example, a driver for the package source may be copied and held while the package is being pulled out.

Still further, a part entry may contain other information fields which might be, for example, additional instructions to be dispatched to a part handler with the part itself. Such fields are of arbitrary length and therefore require an information reference. In one example, a particular driver may be recognizable by the system as being either of two different types, A or B. The information field could specify whether a particular driver being loaded is in fact A or B and thereby allow the driver to be quickly identified when installed. Of course, other information about the parts could also be provided.

Finally, the package directory 78 has an information area 76 housing all the non-part information pointed to by the information references in the package header and part directory. Such non-part information must have a size and position agreeing with the parameters in the information reference. Otherwise, the package manager will be unable to locate the information when processing a new package. The individual pieces of information in the information area 76 may or may not be separated by spaces, but any such spaces must be accounted for by the offsets specified in the information references.

The individual parts are aligned in series within the package. In a preferred embodiment, they are contiguous with no spacer or other region separating them.

DISPATCHING

Figure 5:
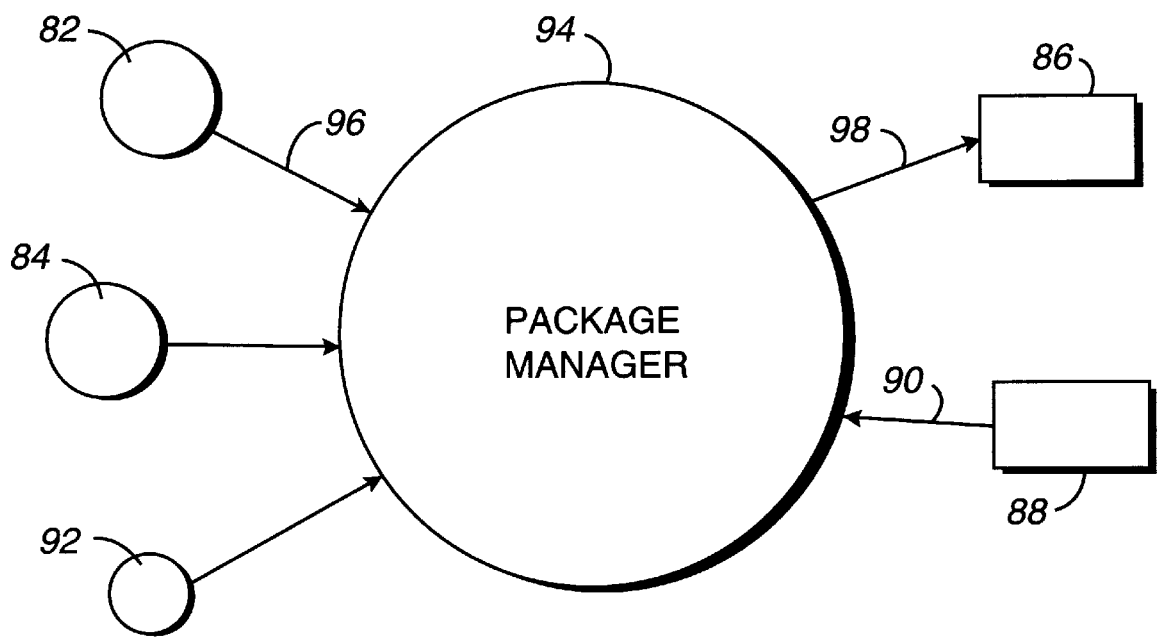
FIG. 5 is a schematic diagram showing the movement of information in the routing system of this invention.

Referring now to FIG. 5, the primary elements of a system of this invention are displayed. A package manager 94 receives one or more packages 82, 84, and 92. The package manager's functions include (1) dispatching parts (for installation or removal), (2) maintaining a registry of part types needed for the part handlers, and (3) maintaining a directory of packages that have been installed. Thus, the package manager 94 can dispatch each part in a package to each part handler in the system. For some parts, however, the package manager will not need to dispatch them to a particular part handler, but will, instead, install the part itself. Such situations will be discussed in more detail below. Generally, packages are processed by the package manager in series (one-by-one), but in some embodiments, the packages may be processed in parallel. As indicated by arrow 96 in FIG. 5, information generally flows from the packages to the package manager. This simply means that packages are delivered to the package manager by some source external to the system. It should be recognized however, that sometimes it will be necessary for the package manager to the inform the source sending the package that an error has occurred, as when the package is unrecognizable or the package has not been successfully loaded.

Part handlers 86 and 88 are shown in FIG. 5. The part handler's functions include installing and removing parts. Part handler 88 is shown sending information to the package manager 94 over line 90. Such information might be a request to register or deregister a certain part type (part type X). Part handler 86 is shown receiving information from the package manager 94 over line 98. Such information might be a confirmation of registration or deregistration of part type X. Alternatively, the package manager might be communicating an error message indicating, for example, that part type X could not be registered or deregistered.

Figure 6:
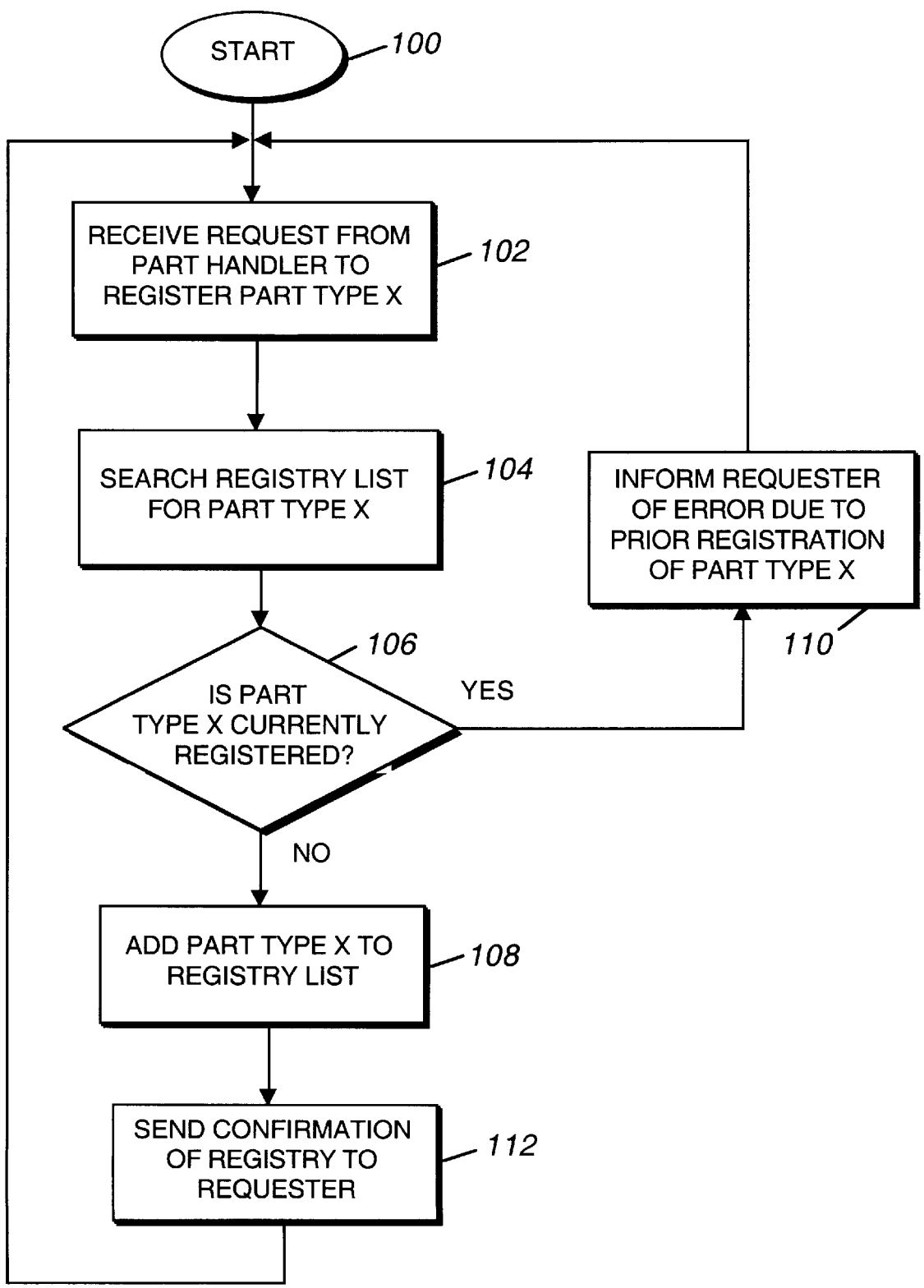
FIG. 6 is a flow diagram showing how requests to register a part type X are handled.

FIG. 6 is a flow diagram showing how a request from a part handler to register a particular part type X is handled by a package manager. As noted above, it is necessary for part handlers to register part types so that the package manager knows where to direct particular parts when they are received. It should be recognized that in requesting registration of a part type, the part handler is responding to a need by a software entity with which it is associated. In the example discussed above, for example, a font manager requires a particular font for a text processing application. The font manager would then direct the part handler associated with it to request the necessary font. Although part handlers like the one associated with a font manager are responsive to the needs of several applications, some part handlers are associated with a single application only. In general, part handlers can be associated with any of a number of applications or other entities in a system.

The process depicted in FIG. 6 begins at step 100. Next at step 102, the package manager receives a request from a particular part handler to register part type X. After the package manager receives the request to register from a part handler, it searches its registry list at step 104 to determine whether part type X has been previously registered. If the package manager determines at conditional step 106 that part type X is not currently registered, then part type X is added to the registry list at 108. The listing will include (1) an identifier of requesting part handler and (2) the part type of interest. Finally, the package manager sends a confirmation of the registry to the requesting part handler at step 112. The package manager now returns to the state it assumes prior to step 102, awaiting instructions to register other part types. The package manager also awaits a package containing part type X, at which time it will route the part to the requesting part handler.

If part type X has already been registered (as determined at decision step 106), the requesting part handler is informed of this at step 10 and no registration takes place. At this point the part handler can submit new requests at appropriate times or take other actions. It should be apparent that in the procedure outlined, only a single part handler can register a single part type at any one time. If another part handler wishes to register the same part type, it must wait until the first part handler has received its part and deregistered itself. In alternative embodiments, more than one part handler can register a given part type. In such embodiments, when a part of the desired part type is received by the package manager, both part handlers are notified.

It should be noted that the package manager contains two different registries or listings which are not to be confused. The one referred to in FIG. 6 maintains a directory of part types desired by the part handlers. Another registry—not considered in FIG. 6—keeps a tally of the packages that have been installed.

Figure 7:
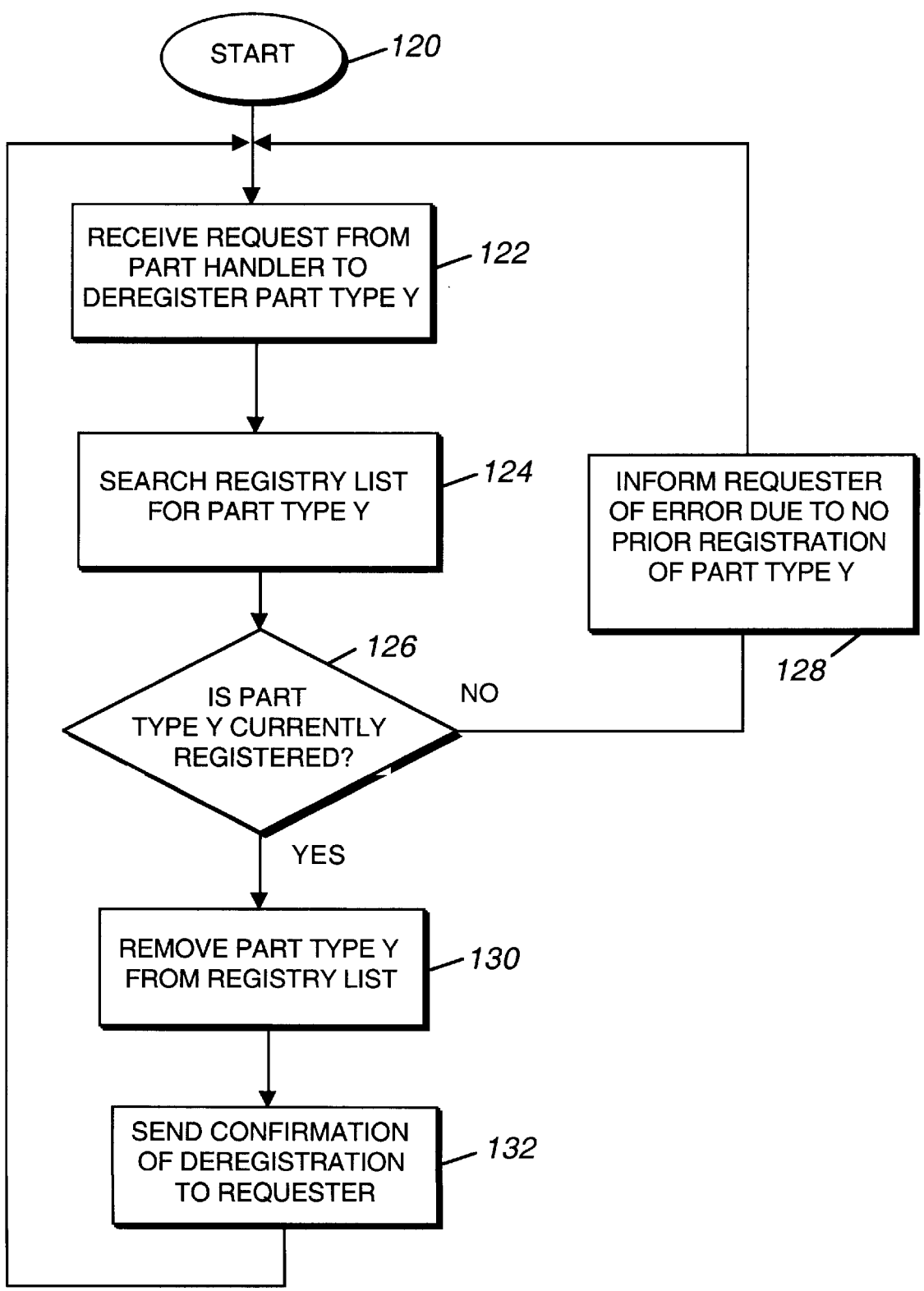
FIG. 7 is a flow diagram showing how requests to deregister a part type Y are handled.

After one or more parts of the registered part type have been received and installed by the part handler, the part handler may have itself deregistered. Other part handlers will then be able to register for the part type. In general, the part handler may opt to deregister itself anytime, but usually only after it has received at least one part of the registered part type. The deregistration procedure is illustrated from the perspective of the package manager in FIG. 7. The process begins at step 120, after which the package manager receives a request from the part handler to deregister part type Y at process step 122. The package manager then searches its registry list at step 124 and determines whether the part type Y is currently registered at decision step 126. If the package manager determines that part type Y is currently registered (as it should be by the part handler requesting the part), the package manager removes part type Y from its registry list at step 130 and sends a confirmation of the deregistration to the requesting part handler at step 132. The system then loops back to await the next deregistration instruction at step 122.

If part type Y is not currently registered, the package manager determines this at decision step 126. This indicates that an error has been committed because the part handler is proceeding as if it has recently received part type Y. This is inconsistent with the absence of part type Y in the registry. The package manager thus informs the part handler at step 128 that the requester that an error has occurred because there is no prior registration of part type Y. The package manager then reverts to a state where it awaits the next deregistation instruction at step 122.

Figure 8:
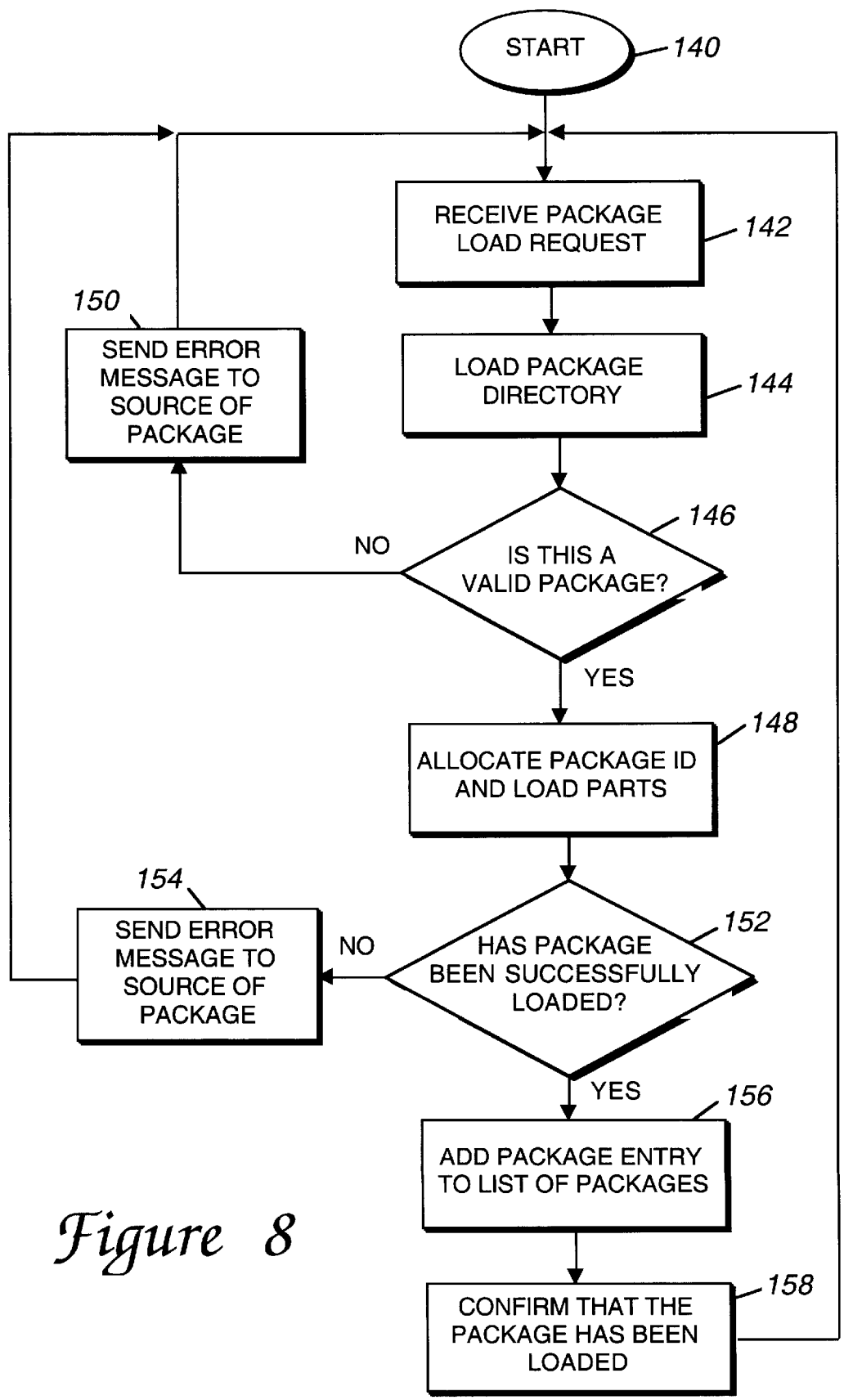
FIG. 8 is a flow diagram of a method for loading packages according to a preferred embodiment of the present invention.

The procedure by which the package manager acts on packages is depicted in FIG. 8. The process is started at step 140 after which the package manager receives a package load request at step 142. This request can come from most any source in the system. Typically, it will come from portions of the system that listen the external devices such as networks or servers. When the package arrives, the package manager first loads the package directory as shown at 144. As noted above, the directory contains various pieces of information (such as size and special instructions) about the package and its parts. The package may come as either a stream or a pointer to a memory location where the package resides. From the package directory, the system can determine whether the package is "valid" at decision step 146. This is accomplished by first determining whether the same package has already been processed by the package manager. If so, the package is deemed invalid. If not, the package structure is evaluated to determine whether it is correct. This can take various forms. Typically, the package identifier at the top of the package header is checked to ensure that a package has indeed been sent. In addition, at least some of the information references in the package directory typically are examined. If any of them point to material that falls beyond the bounds of the package, the package structure is deemed invalid. Still further, the system may check to ensure that it has enough memory to load the package before actually beginning the process. Regardless of how it may be determined, if the package is found to be invalid, the logic directs the package manager to send an error message to the source of the package as shown at step 150 and then returns to step 142.

If the package is determined to be valid, the package manager will allocate a package identifier for the package and then load the parts to the appropriate destinations (usually part handlers) as indicated at step 148. It is necessary that the package manager give each package a unique identification so that the manager can keep track of each package in the system. As explained below, the package manager maintains a registry of each package that has been loaded in the system. After step 148, the package manager determines whether it has succeeded in loading the parts of the package at decision step 152. If the procedure has not been successful, the package manager sends an error message to the source of the package at step 154 whereupon the process control returns to step 142.

If the package has been successfully loaded, a package entry is added at process step 156 to the list of packages in the package manager. This is the second registry in the package manager. It should not be confused with the registry discussed in connection with FIGS. 6 and 7 (see steps 104 and 124). The package entry includes (1) the package identifier added by the package manager at step 148, (2) the package name (from the package header), (3) an "autoremove reference," and (4) a list of part types in the package and corresponding remove-object pointers. The remove-object reference is supplied by the part handler to the package manager in reply to an install request from the package manager. Because a part-handler might install more than one part (and each part might belong to a separate package), some mechanism must be employed to remove only the parts that comprise the package to be removed. The remove-object reference plays a role in this mechanism. If a particular part handler has installed more than one part (e.g., five parts), it must correctly decide which of them to remove when it receives removal instructions from the package manager. Thus, the autoremove reference is provided so that the package manager can tell the part handler to remove only the part having a specified remove-object reference. Finally, the package manager sends a confirmation to the package source at step 158 that the package has been successfully loaded and process control returns to before step 142, where the package manager awaits the next package load request.

Figure 9:
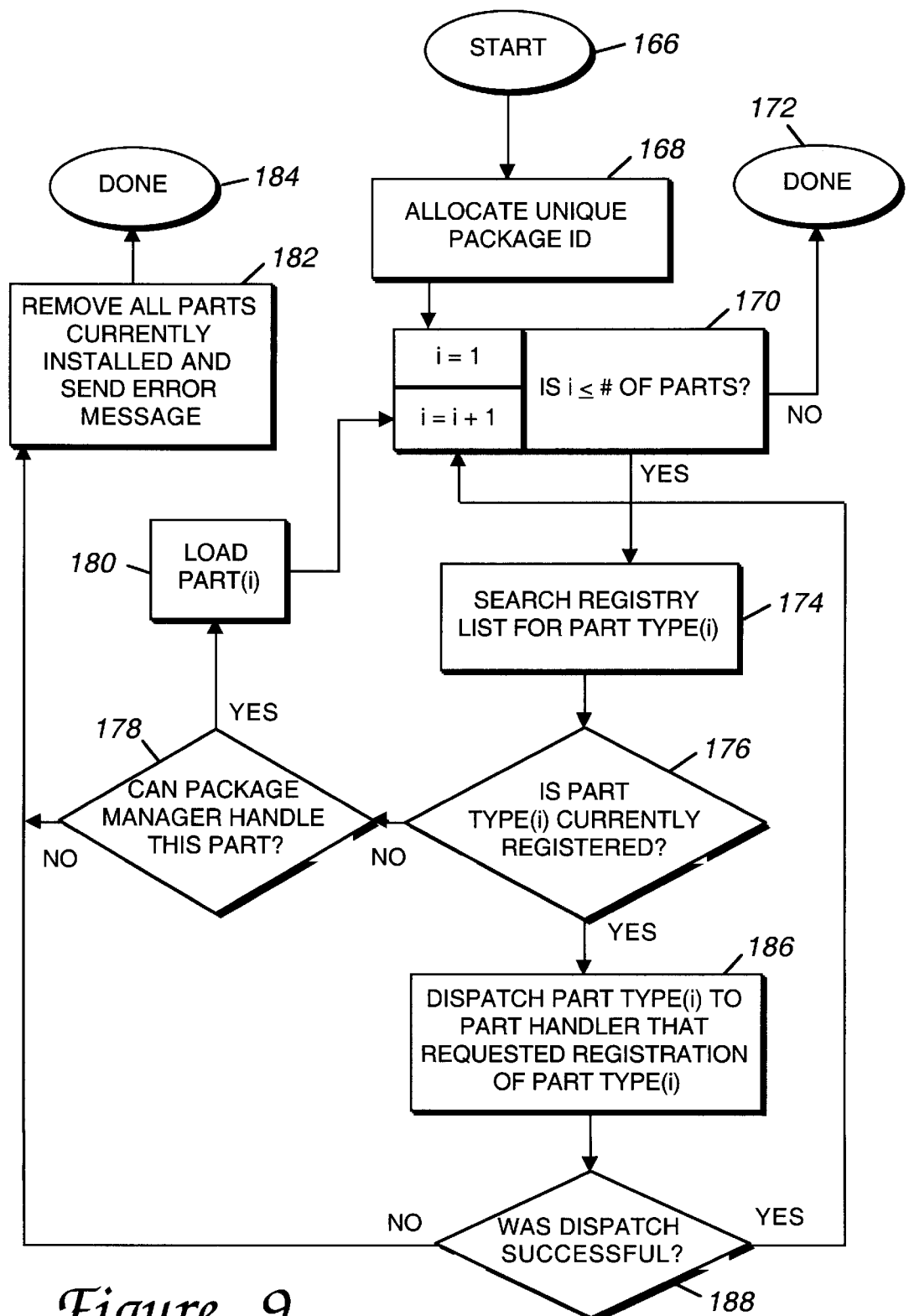
FIG. 9 is a flow diagram of a procedure employed to process and route individual parts of package in the method depicted in FIG. 8.

The details of the procedure for allocating the package identification and loading the parts (step 148 of FIG. 8) are shown in FIG. 9. The process begins at step 166 and proceeds to step 168 where the package manager allocates the unique package identifier. Then system enters a loop in which each part in the package is evaluated and dispatched to a part handler or otherwise processed, if possible. An iterative loop step 170 itializes a part counter i to 1 and compares it to the value of the total number of parts in the package. If i is less than or equal to the number of parts, process control moves to process step 174 where the registry list is searched to determine whether that part type of the part under consideration is currently registered by a part handler. If the part type of the part is currently registered (as determined at step 176), the package manager will direct that the part be dispatched to the part handler that requested registration of that part type (step 186). If the package manager determines that the dispatch was successful (at step 188), and process control loops back to step 170 where the part counter is incremented and the next part is considered. This process continues as long as each part can be successfully dispatched to the a part handler. Finally, when each part has been successfully loaded or dispatched, the loop is exited and the process is completed at step 172.

If the package manager determines at step 176 that the current part type (part type(i)) is not currently registered, the package manager must decide whether it can successfully handle the part without help from a part handler. If this determination is negative, the package manager directs that all previously installed parts be removed (step 182) and that the process be aborted (step 184) unless the package contains group information that only certain installed parts are to be removed. If on the other hand, the package manager determines that it can handle the part, the loading is performed at step 180 and then the system loops back to step 170 where the part counter is incremented and the next part is considered. Parts loaded in this manner do not need to be dispatched to part handlers for loading. Examples of such parts include autoload protocols Autoload protocols are registered and added directly to a system-wide protocol list. Once registered, clients of protocols can look up the new protocol in the protocol list and employ one for their use.

In the procedure depicted in FIG. 9, each part of the package is removed if any one part can not be successfully loaded. This is because packages are generally autonomous units in which in each part may be important to the desired function. Thus, if a single part can not be installed, one can not safely assume that the system will perform as desired. As explained above, some packages may contain "group information," which specifies which parts in a given package act together as units. If such information is available and there is more than one group in a package, then some selected parts may be removed (without removing all parts in the package) when an unusable part is encountered at step 178. For example, if a package contains four parts and the group information indicates that parts one and two are one unit and parts three and four are a second unit, only part three would need to be removed if part four was found to be unusable. In addition, higher level code is free to edit packages (e.g. add and remove parts) if it understands the nature of these parts.

Figure 10:
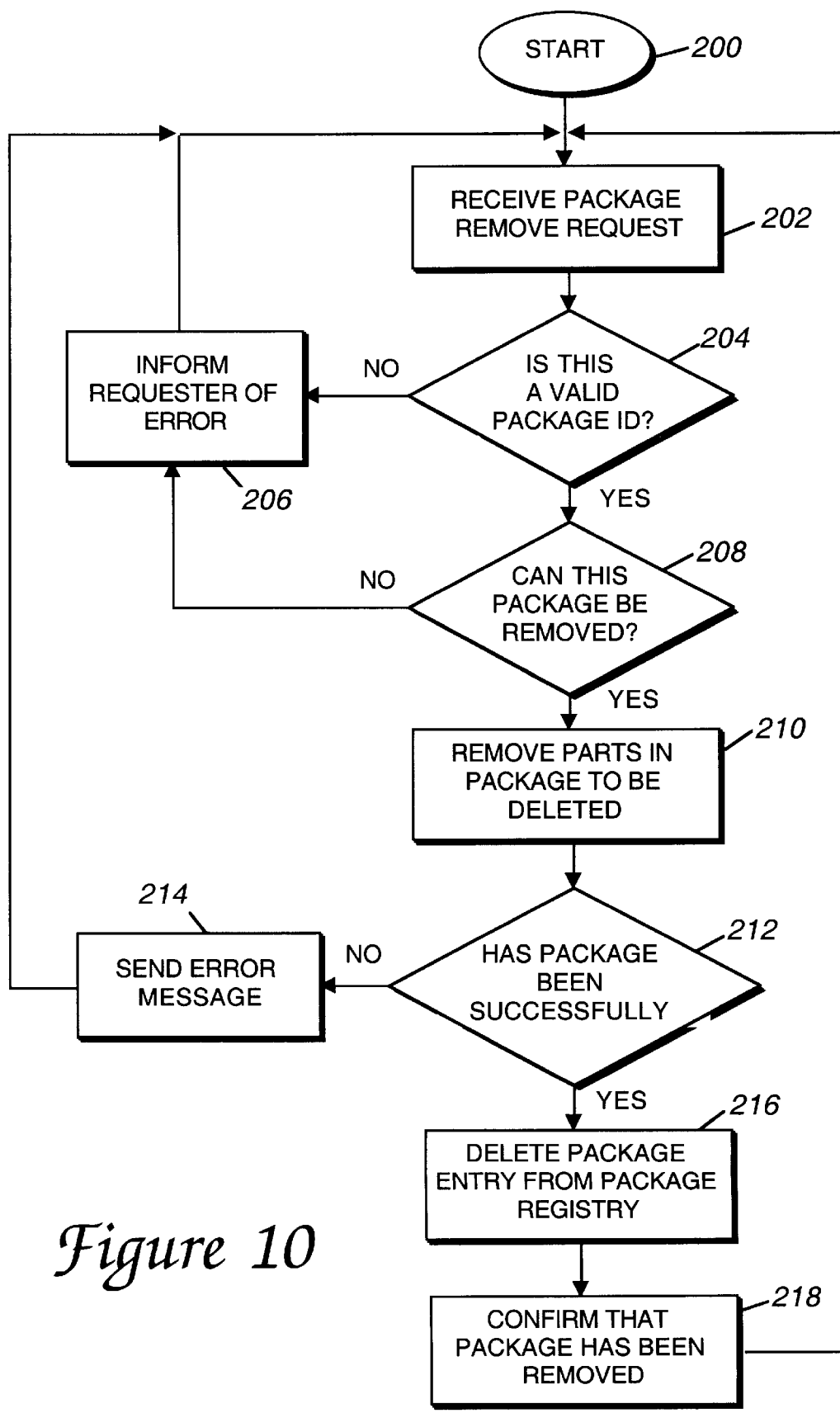
FIG. 10 is a flow diagram of a method for removing packages according to a preferred embodiment of the present invention.

From time to time it becomes necessary to remove a package. For example, the user may direct the system to remove a package to free up more space. Alternatively, the system itself may determine that a package is no longer necessary and therefore instruct the package manager to remove the package. The general procedure for removing packages is shown in FIG. 10. The procedure begins at step 200 after which the package manager receives a package remove request from any of a number of possible sources. First, the package manager looks in the package registry to determine (at conditional step 204) whether the request contains a valid package identifier. If not, the requesting entity is informed (step 206) of the error and the package manager awaits further instructions. Assuming that the package for which the remove request has been logged has a valid identifier, the package manager next determines whether there is any other reason why the package can not be removed (step 208). The package might not be removable because it is still be required by entities in the system (other than those asking to have it removed). As an example, a facsimile driver may be busy faxing when someone asks that the driver be removed. If the package can not be removed for such a reason, the package manager informs the requesting entity (at step 206) and awaits further instruction.

If the package manager determines that the package can be removed, it initiates removal of each part in the package (step 210). Then the package manager determines whether the removal has been successfully accomplished at decision step 212. If not, it sends an error message at process step 214 and returns to await the next package remove request at step 202. Assuming that the package removal has been successful, the package manager removes the entry for that package from its package registry (step 216). In this manner, the package manager keeps a running tally of which packages are currently installed in the system. Finally, the package manager sends a confirmation that the package has been successfully removed at step 218 and returns to await the next package remove request at step 202.

Figure 11:
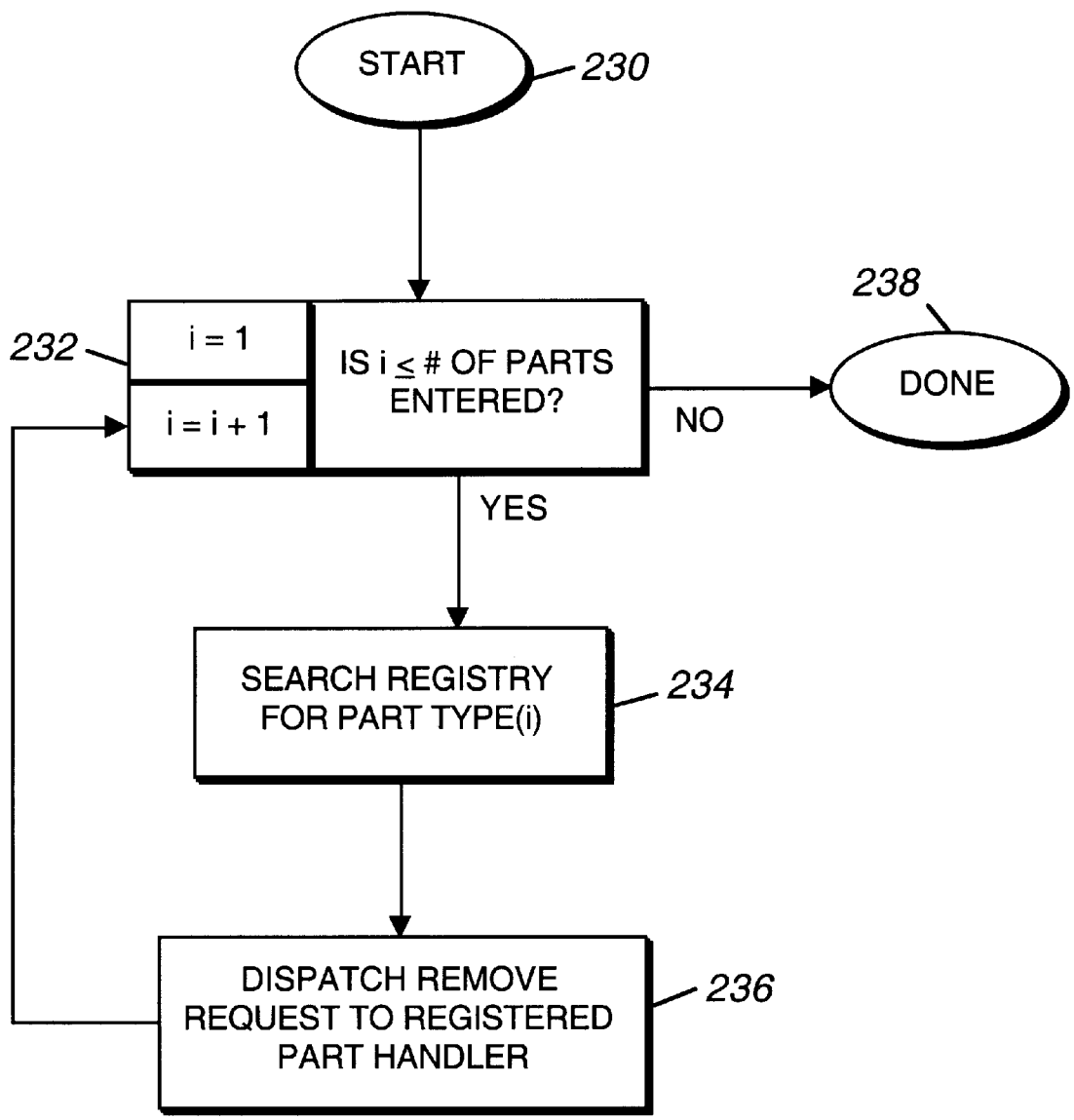
FIG. 11 is a flow diagram of a procedure employed to the package manager to initiate removal of individual parts in the method depicted in FIG. 10.

The details of the package manager's role in actually removing the parts in the package are shown in FIG. 11. This corresponds to step 210 in FIG. 11. The process begins at step 230 and then begins considering the individual parts that make up the package. An iterative loop step 232 initializes a part counter i to 1 and compares i to the total number of parts in the package. As long as i is less than or equal to the number of parts, the package manager searches its part handler registry for the part type of the part under consideration (step 234). When the part type is located, the package manager determines which part handler has loaded the part and dispatches a remove request to the registered part handler (step 236). The part handler then takes the necessary steps to remove the part. Process control returns to iterative loop ste 232 where the part counter is incremented and the next part is considered. The above process continues until the last part is evaluated. At that point, process control exits the loop and the procedure is completed at step 238.

While this invention has been described in terms of several preferred embodiments, there are alterations, permutations, and equivalents which fall within the scope of this invention. It should also be noted that there are may alternative ways of implementing the processes of the present invention. It is therefore intended that the following appended claims be interpreted as including all such alterations, permutations, and equivalents as fall within the true spirit and scope of the present invention.

What is claimed is:

1. A computer program product having a computer-readable medium embodying a package data structure for automatically routing computer information within a computer system, said computer information originating from an information source and being automatically dispatched to at least one of a plurality of software entities within said computer system by a package manager, the package of the computer program product comprising:

(a) one or more parts containing said computer information usable by at least one of said plurality of software entities, each part having an associated part kind attribute characterizing a known inherent feature of that portion of the computer information contained in said part and an associated part type attribute defining the type of software entity that can use that portion of the computer information contained in the part; and (b) a package directory describing characteristics of said package and of said computer information, said characteristics including the part type attribute and the part kind attribute of each of the one or more parts, said package directory being used by said package manager to route said computer information contained in said one or more parts to at least one of said plurality of software entities.

2. The computer program product of claim 1 wherein the package directory identifies each part of said one or more parts as being of a part kind that is either (i) a high level language, (ii) a language class that allows objects to be dynamically loaded into the computer system, or (iii) an unspecified kind of information.

3. The computer program product of claim 1 wherein the package directory includes:
   a package header having one or more information references pointing to data characterizing the package that is contained in the package;
   a part directory having one or more part entries each containing data characterizing an individual one of said one or more parts in the package; and
   an information area containing the data characterizing the package that is pointed to by the one or more information references in the package header.

4. The computer program product of claim 1 wherein the package includes more than one part and each part is contiguous, having no spaces separating one another.

5. The computer program product of claim 1 wherein said information source is a computer network and the package is provided as stream of data from said computer network.

6. The computer program product of claim 1 wherein said information source is a memory of said computer system and the package is provided by direct connection with said memory.

7. The computer program product of claim 3 wherein the information references are pointers describing the location of said data characterizing the package by identifying (i) an offset between a fixed point in the package and the beginning of that data, and (ii) the size of that data.

8. The computer program product of claim 3 wherein the package header includes an identifier indicating that the succeeding material is a package; and wherein said one or more information references point to fields that include a package name, a package size, and a package directory size.

9. The computer program product of claim 3 wherein each one of the one or more part entries include:
   an information reference pointing to an associated individual one of said one or more parts in the package;
   the part kind attribute of the associated part; and
   the part type attribute of the associated part.

10. The computer program product of claim 3 wherein the information area includes a package name pointed to by one of said one or more information references in the package header.

11. The computer program product of claim 8 wherein the identifier is eight bytes in length.

12. A method of automatically routing computer information to a software entity in a computer system having a part handler associated with said software entity and a package manager for automatically routing the computer information, the computer information originating from any of a plurality of information sources and being supplied as packages, each package including at least one part, each part having a particular part type defining the type of software entity that can use that portion of the computer information contained in the part, the method comprising the following steps:
   transmitting a request from the part handler associated with said software entity to the package manager to register a particular part type;
   registering the particular part type with the package manager in a registry of part handlers;
   evaluating packages arriving at the package manager from said plurality of information sources to determine whether a package contains a particular part having the particular part type; and
   routing the particular part having the particular part type to the part handler associated with said software entity requesting registration of the particular part type.

13. The method of claim 12 wherein the packages arriving at the package manager arrive one after the other, in series.

14. The method of claim 12 wherein at least some of the packages arriving at the package manager arrive as a stream of data from a computer network.

15. The method of claim 12 wherein at least some of the packages arriving at the package manager arrive over a direct connection with a memory of said computer system.

16. The method of claim 12 further comprising the following step conducted before the step of registering the particular part type:
   searching the registry of part handlers to determine whether the particular part type is currently registered, and, if so, refusing to register the particular part type.

17. The method of claim 12 wherein after receiving one or more parts of the particular part type requested, the part handler associated with said software entity requests that the particular part type be deregistered from the registry of part handlers of the package manager.

18. The method of claim 12 wherein the package manager, upon receiving a package from one of said plurality of information sources, conducts the following steps:
   allocating a unique package identification to the package which distinguishes it from other packages; and
   evaluating each part in the package to determine whether said part has a part type equivalent to a part type registered in said registry of part handlers, and
   routing the individual parts in the package having a part type equivalent to a part type registered in said registry of part handlers to an appropriate part handler associated with a software entity.

19. The method of claim 16 further comprising a step of sending a confirmation to the part handler that the particular part type has been registered in the registry of part handlers after determining that the particular part type is not currently registered.

20. A method of automatically routing computer information to software entities in a computer system, the computer system having a package manager and one or more part handlers associated with individual ones of said software entities in the computer system, the computer information being provided in the form of parts contained within a larger package, each part having a particular part type defining the type of software entity that can use that portion of the computer information contained in the part, the method comprising the following steps:
   directing a package from an external information source to the package manager, the package manager being a centralized resource for evaluating said computer information provided in said package independent of said software entities and for automatically routing said computer information to appropriate ones of said one or more part handlers associated with said individual ones of said software entities;
   determining whether each part in the package is of a part type that can be used by either one of said one or more part handlers or the package manager; and
   dispatching each part of a part type that can be used by one of said one or more part handlers to a selected part handler that can use the part.

21. The method of claim 20 wherein the step of determining whether each part in the package is of a part type that can be used includes a process comprising:

having each one of said one or more part handlers request that the package manager register a particular part type when that particular part type is needed by the part handler; and having the package manager review the part type of each part in the package to determine whether the part type has been registered with the package manager.

22. The method of claim 20 further comprising a step of sending a package load request to the package manager to direct the package to the package manager from the external information source.

23. The method of claim 20 further comprising a step of determining whether the package is a valid package before determining whether each part in the package is of a part type that can be used.

24. The method of claim 20 further comprising a step of registering the package in a registry of packages after the parts of the package have been dispatched.

25. The method of claim 20 further wherein said one or more part handlers associated with said individual ones of said software entities to which parts are dispatched send remove-object references to the package manager, each remove-object reference specifically identifying the dispatched part that has been sent to said part handlers.

26. The method of claim 23 wherein the package includes a package directory containing offset values specifying how far from the beginning of the package that the parts and other data within the package are located, and wherein the step of determining whether a package is a valid package includes a step of determining whether each offset value falls within the package.

27. The method of claim 24 further comprising a step of allocating a unique identification to the package and including that identification in the registry of packages.

28. A routing system for automatically dispatching computer information to software entities within the routing system, the computer information originating from a plurality of information sources and being provided in the form of parts contained within a larger package, each part having a particular part type defining the type of software entity that can use that portion of the computer information contained in the part, the routing system comprising:

a package manager which receives packages from said plurality of information sources and automatically routes said packages to said software entities, the package manager being a centralized resource for evaluating said computer information provided in said packages independent of said software entities, the package manager having a first directory listing the packages that are currently installed in the routing system, the package manager also having a second directory listing the part types currently needed by said software entities in the routing system; and one or more part handlers associated with individual ones of said software entities in the routing system and communicating with the package manager.

29. The routing system of claim 28 wherein the package manager includes means for allocating a unique package identification to each package it receives.

30. The routing system of claim 28 wherein the package manager includes means for determining the part type of each part in a package.

31. The routing system of claim 30 further comprising means for routing parts having part types listed in the second directory to part handlers associated with the software entities needing the particular part types.

* * * * *